United States Patent [19]

Melacini et al.

[11] 3,839,288

[45] *Oct. 1, 1974

[54] PROCESS FOR THE BULK POLYMERIZATION OF ACRYLONITRILE

[75] Inventors: Paolo Melacini, Mestre; Luigi Patron; Alberto Moretti, both of Venezia; Raffaele Tedesco, Mestre, all of Italy

[73] Assignee: Montefibre S.p.H., Milan, Via Pola, Italy

[ * ] Notice: The portion of the term of this patent subsequent to Jan. 22, 1991, has been disclaimed.

[22] Filed: Sept. 21, 1972

[21] Appl. No.: 290,982

Related U.S. Application Data

[63] Continuation-in-part of Ser. No. 136,901, April 23, 1971, Pat. No. 3,787,365.

[30] Foreign Application Priority Data

Apr. 28, 1970 Italy.................................. 23963/70

[52] U.S. Cl... 260/63 N, 260/29.1 R, 260/29.6 AN, 260/30.8 DS, 260/32.6 N, 260/79.3 R, 260/82.3, 260/82.5, 260/82.7, 260/83.1, 260/85.5 R, 260/85.5 P, 260/88.7 R, 260/88.7 G

[51] Int. Cl.......................... C08f 3/76, C08f 15/22

[58] Field of Search..... 260/88.7 R, 88.7 D, 85.5 R, 260/85.5 F, 82.3, 82.7, 63

[56] References Cited
UNITED STATES PATENTS

| | | | |
|---|---|---|---|
| 2,661,363 | 12/1953 | Dickey............................ | 260/88.7 D |
| 3,637,621 | 1/1972 | Monaco et al................. | 260/85.5 R |

*Primary Examiner*—Harry Wong, Jr.
*Attorney, Agent, or Firm*—Hubbell, Cohen & Stiefel

[57] ABSTRACT

Free-radical bulk polymerization of acrylonitrile with or without another copolymerizable ethylenically unsaturated monomer, using a free-radical catalytic system having a decomposition rate constant ($K_d$) greater than 1 hr.$^{-1}$ at the polymerization temperature, a reaction time (Q) sufficient to semi-decompose the catalyst, and a catalyst concentration $(C)_o$ equal to or greater than $Q \times 2 \times 10^{-3}$ moles/liter, wherein "Q" is the residence time expressed in hours.

8 Claims, No Drawings

PROCESS FOR THE BULK POLYMERIZATION OF ACRYLONITRILE

CROSS-REFERENCE TO RELATED APPLICATION

This application is a continuation-in-part of our co-pending application Ser. No. 136,901, filed Apr. 23, 1971, and now U.S. Pat. No. 3,787,365.

BACKGROUND OF THE INVENTION

1. Field of the Invention

The present invention relates to a process for the bulk polymerization of acrylonitrile, either alone or together with co-monomers copolymerizable therewith. More particularly, the present invention concerns an improved process for the free-radical bulk polymerization of acrylonitrile, which process provides a high degree of control of the reaction conditions and the reaction mixture viscosity and results in high polymerization conversions.

2. Description of the Prior Art

Heretofore, the free-radical bulk polymerization of acrylonitrile at room temperature or higher temperatures has not been an industrially feasible process.

Primarily, this has been due to the difficulty of (1) finding a catalytic system that is soluble in the monomer and capable of achieving a high degree of efficiency together with easy control of the polymerization reaction, and (2) of finding reaction conditions suitable to maintain the polymerization mixture in a sufficiently fluid state to facilitate mixing the reaction medium and dissipation of the heat generated by the reaction.

Thus, it is well known that the bulk polymerization of acrylonitrile, under certain conditions, can become auto-catalytic, which can lead to loss of control of the polymerization and explosions due to the rapid development of hot spots. The self-catalytic course of this type of reaction is due to a reduction in the rate of chain-termination of the macroradicals resulting from their being trapped in the precipitated polymer. (See W. H. Thomas in "Mechanism of Acrylonitrile Polymerization" — Fortschritte der Hochpolymeren-Forschung, 2nd volume, pages 401-411, 1961.)

The extent of this phenomenon, referred to in the literature as the "gel effect," depends on the degree of swelling of the polymer in the reaction medium and, thus, on its apparent density. Inasmuch as, during the polymerization, the polymerization medium rapidly thickens due to the adsorption of the monomer into the polymer, it becomes increasingly difficult to stir the mixture and dissipate the heat of the reaction. Consequently, the increase of polymerization rate, combined with the contemporaneous increase in viscosity of the polymerization medium, causes the temperature to rise, which in turn further increases the reaction rate. Thus, the polymerization gradually gets out of control and often results in an explosion.

It is known that this catalytic effect of the precipitated polymer on the polymerization rate increases proportionately with the concentration of the catalyst. (See C. H. Bamford, W. G. Barb, A. D. Jenkins, and P. F. Onyon — "The Kinetics of Vinyl Polymerization by Radical Mechanism" — Butterworts 1958, page 113.)

Kinetically expressed, the polymerization rate (Rp) is dependent on the concentration (C) of the catalyst according to the equation:

$$Rp = K(C)^\alpha$$

wherein $K$ is a constant, while $\alpha$ ranges from 0.7 to 0.9, instead of being equal to 0.5 as in the case of non self-catalytic polymerizations. (See C. H. Bamford, W. G. Barb, A. D. Jenkins, and P. F. Onyon — supra, and C. H. Bamford, and A. D. Jenkins, Proc. Roy. Soc., London, Ser. A 216,515, 1953.)

In the bulk polymerization of acrylonitrile catalyzed by benzoyl peroxide or azo-bis-iso-butyronitrile, values for $\alpha$ of 0.75 and 0.82, respectively, have been observed. (See W. M. Thomas, J. Polymer Sci., n. 13, page 329, 1954.) These values indicate the self-catalytic nature of the polymerization reaction.

To date, the industrial scale bulk polymerization of acrylonitrile has been considered unfeasible because the process can be controlled only at low initiation rates and with small quantities of reaction monomer. (See W. H. Thomas, "Mechanism of Acrylonitrile Polymerization" — Fortschritte der Hochpolymeren-Forschung, volume 2, page 410, 1961.)

As is evident from the foregoing, the temperature of such processes must be controlled by continuously removing the polymerization heat. For this purpose it is necessary, especially when large reactors are used, to maintain the viscosity of the polymerization medium at low levels. That is to say, it is necessary to operate under such conditions as to minimize the amount of monomer absorbed by the polymer.

Although it is recognized that in order to minimize the monomer adsorption the polymer must possess a compact structure, generally accompanied by a high apparent density, methods for accomplishing this, particularly on an industrial scale, have not been available.

SUMMARY OF THE INVENTION

We have discovered a new process for the free-radical catalyzed, bulk polymerization of acrylonitrile, with or without another copolymerizable ethylenically unsaturated monomer, wherein the polymer exhibits a high apparent density, thereby permitting excellent and easy control of the polymerization temperature. Our invention comprises carrying out the bulk polymerization of the acrylonitrile under certain combinations of critical conditions.

More particularly, the present process comprises:

a. Polymerizing acrylonitrile, either alone or in admixture with up to about 50 moles percent of at least one other copolymerizable ethylenically unsaturated monomer, using either a continuous or a semi-continuous method;

b. using a free-radical catalytic system having a decomposition rate constant ($K_d$) greater than 1 hr.$^{-1}$ at the polymerization temperature;

c. using a reaction or residence time (Q) at least sufficient to semi-decompose the catalyst; and d. using a catalyst concentration $(C)_o$ at least equal to $2\times10^{-3}$ Q moles/liter, wherein "Q" is the reaction or residence time expressed in hours.

By the term "semi-continuous method" is meant a polymerization carried out by a continuous feed of the reactants over a definite interval of time without continuously discharging the polymerization mixture. Continuous polymerization is carried out by continuously adding the reactants to a well stirred reactor, so as to assure homogeneous composition, and simultaneously discharging the reaction mixture over an indefinite interval of time (see Stanley Walas, Reaction Kinetics for Chemical Engineers, McGraw-Hill, 1959, pages 79-100).

DESCRIPTION OF THE PREFERRED EMBODIMENTS

For polymerizations carried out in stirred continuous reactors the concentration of catalyst having a decomposition rate constant $K_d$ is determined by solving the expression equating the moles fed in $(C)_o$ to the sum of the reacted moles $(K_dQC)$, and the moles discharged unaltered $(C)$. The following expression is obtained:

$$(C)/(C)_o = 1/1+K_dQ \qquad 1.$$

At the semi-decomposition time $(S)$, the following condition exists:

$$(C) = \tfrac{1}{2} (C)_o \qquad 2.$$

or $$(C)_o = 2 (C). \qquad 3.$$

According to equation (1), the condition of equation (3) is fulfilled when $$S = 1/K_d, \text{ and} \qquad 4.$$

inasmuch as $Q = S$, one obtains:

$$K_dQ \geq 1. \qquad 5.$$

Considering equation (5) together with condition (d) above, it follows that in the case of the continuous bulk polymerization of acrylonitrile, the residence time $(Q)$ falls within the range:

$$1/K_d \leq Q \leq (C)_o/2\times 10^{-3} \qquad 6.$$

When the bulk polymerization of acrylonitrile is carried out under the foregoing conditions, the process may be easily controlled and thus becomes industrially feasible. It is noted that these conditions, i.e., the use of a catalyst having a high decomposition rate (thus a high initiation rate) and a high level of catalyst activity, are substantially different from those suggested by the prior art.

Additionally, with regard to the decomposition rate constant $(K_d)$, it is noted that $K_d$ for a thermal catalyst is defined by the kinetic equation:

$$-d(C)/dt = K_d (C), \qquad 7.$$

wherein $(C)$ is the catalyst concentration in the reaction medium.

For catalytic systems of the redox type, an equation such as (7) must be completed by taking into account the concentration of the reducing agent $(A)$ which is commonly referred to as "the activator." Equation (7) thus reads:

$$-d(C)/dt = K'_d (C) (A) \qquad 8.$$

wherein $K'_d$ represents the second order decomposition rate constant.

In any discussion hereinafter wherein the rate constant of a redox system is being referred to, such rate constant, although designated as $K_d$, must be intended as the product $K'_d (A)$, thus again reducing equation (8) to the form of equation (7).

If any one of the foregoing conditions ($a,b,c$, or $d$) is not present, the advantages of the present process will not be realized. Thus, when the bulk polymerization of acrylonitrile is carried out with a catalytic system having a decomposition rate constant greater than 1 hr$^{-1}$ in a discontinuous process, a low, industrially unacceptable conversion rate is obtained. This is due to the rapid decomposition of the catalytic system.

In contrast, when catalytic systems having decomposition rate constants lower than 1 hr$^{-1}$ are used, the polymerization will be extremely sensitive to temperature. Thus, small temperature increases effect large increases in the polymerization rate, resulting in loss of control of the polymerization.

The critical effect of the decomposition rate constant of the catalyst on the temperature sensitivity of the polymerization is exemplified in Tables I-IV.

The data in Table I illustrate the effect of temperature on the discontinuous polymerization rate of a mixture of monomers consisting of 83 percent by weight acrylonitrile and 17 percent by weight vinyl acetate when benzoyl peroxide, having a decomposition rate constant of $4.1 \times 10^{-3}$ hr$^{-1}$ at a temperature of 55°C, is used as the catalyst. The reaction time was 60 minutes.

TABLE I

| Concentration of catalyst, (moles/liter) | Temperature, °C | Conversion rate, % hour |
|---|---|---|
| 0.01 | 30 | 0.6 |
| 0.01 | 40 | 4 |
| 0.01 | 50 | 30 |
| 0.01 | 60 | 90 |

Similar results are observed when the catalyst was azo-bis-iso-butyrenitrile, having a decomposition rate constant of $9.5 \times 10^{-3}$ hr$^{-1}$ at 50°C.

Under the same conditions used in Table I, but using a continuous polymerization procedure and azo-bis-iso-butyronitrile as the catalyst, the reaction is still highly sensitive to changes in reaction temperature, as can be seen from the data in Table II:

TABLE II

| Catalyst | Concentration in % by weight with respect to the monomer | Temperature °C | Conversion rate %/hr | Remarks |
|---|---|---|---|---|
| Azo-bis-iso-butyronitrile ($K_d$ at 50°C = 9.5 × 10$^{-3}$ hr$^{-1}$) | 2 | 40 | 0.6 | Irregular course of reaction |

TABLE II — Continued

| Catalyst | Concentration in % by weight with respect to the monomer | Temperature °C | Conversion rate %/hr | Remarks |
|---|---|---|---|---|
| do. | 2 | 50 | ~6 | Irregular course of reaction. Temperature control impossible. |
| do. | 2 | 60 | — | Reaction uncontrollable. |

In contrast, Table III illustrates the substantial improvement, in terms of decreased sensitivity to temperature changes, when, in accordance with the present process, a continuous polymerization procedure and a catalyst having a $K_d$ greater than 1 hr$^{-1}$ are used. In this case, the catalyst was a redox system consisting of cumene hydroperoxide and sodium methyl sulfite ($K_d = 2.4$ hr$^{-1}$).

The monomers reacted consisted of a mixture of 83 percent by weight acrylonitrile and 17 percent by weight vinyl acetate. The residence time was 60 minutes.

TABLE III

| Concentration of cumene hydroperoxide, %, based on monomer mixture | Molar ratio sodium methyl sulfite/cumene hydroperoxide | Temp. °C | Conversion rate %/hr | Remarks |
|---|---|---|---|---|
| 0.16 | 1 | 30 | 37.1 | Polymerization medium highly fluid |
| 0.16 | 1 | 40 | 42.6 | Polymerization medium highly fluid |
| 0.16 | 1 | 50 | 47.5 | Polymerization medium highly fluid |
| 0.16 | 1 | 60 | 47.5 | Polymerization medium highly fluid |

It is clear from the data in Table III that under the conditions of the present invention the temperature sensitivity of the process is minimized.

A series of continuous bulk polymerizations was carried out using a mixture of monomers consisting of 83 percent by weight acrylonitrile and 17 percent by weight vinyl acetate. The residence time was 60 minutes and the polymerization temperature was 50°C. The decomposition rate constant of the catalyst (and in one case the catalyst itself) was varied for each polymerization. The conditions and results of this series are set forth in Table IV.

TABLE IV

| | Catalyst Type | Quantity based on monomers % | $K_d$, hr$^{-1}$ | Conversion rate, %/hr | Remarks |
|---|---|---|---|---|---|
| 1) | Azo-bis-iso butyronitrile | 2% | 9.5×10$^{-3}$ | ~6 | Thickened reaction medium. Temperature control impossible. |
| 2) | Cumene hydroperoxide | 0.040% | | | Control of the reaction at the limit of acceptability. |
| | Sulfur dioxide | 0.169% | 1.03 | 12 | |
| | Water | 50 ppm | | | |
| 3) | Cumene hydroperoxide | 0.040% | | | Control of the reaction is fair |
| | Sulfur dioxide | 0.169% | 6.1 | 18 | |
| | Water | 300 ppm | | | |
| 4) | Cumene hydroperoxide | 0.040% | | | Reaction medium very fluid. Excellent control of reaction. |
| | Sulfur-dioxide | 0.169% | >10 | 31 | |
| | Water | 3000 ppm | | | |

It should be noted that the uppermost value of $K_d$ is limited (i.e. the radicals originating directly from the catalyst or catalyst components) by the combination of the primary radical, which occurs when the product $K_d(C)$ is higher than the addition rate of the primary radicals to the monomers.

The decomposition rate constant $K_d$ of the catalyst, when it is not known, may be conveniently determined as follows:

A polymerization is carried out using a discontinuous process, i.e., feeding the monomer and the catalytic system into the polymerization reactor at the same time, and continuing the reaction until the maximum conversion is reached (until the complete decomposition of the catalyst is obtained). The conversion is measured at periodic time intervals during the polymerization. From this data, the time required to reach 29 percent of the final maximum conversion is determined. This time ($s$) is the semi-decomposition time of the catalyst used in a discontinuous process.

The conversion corresponding to the semi-decomposition time of the catalyst and the final conversion are linked by the following equation:

$$Cs/Cf = 0.29 \qquad 9.$$

wherein $Cs$ is the conversion in percent corresponding to the semi-decomposition of the catalyst in a discontinuous process and $Cf$ is the final conversion in percent.

In a discontinuous process, the semi-decomposition time $(s)$ is related to the decomposition rate constant $(K_d)$ by the equation:

$$s\, K_d = \ln 2 = 0.7. \qquad 10.$$

(See S. W. Benson, "The Foundations of Chemical Kinetics," page 24, McGraw-Hill, 1960).

After experimentally determining $s$, $K_d$ may be calculated from equation (10).

For a continuous process, the semi-decomposition time $(S)$ is related to the semi-decomposition time for a discontinuous process $(s)$ by the equation:

$$S = 1.43\, s. \qquad 11.$$

Inasmuch as the residence time $(Q)$ must be equal to or greater than the semi-decomposition time $(S)$ of the catalyst, and the product $K_d \times Q$ must be equal to or greater than 1, it follows from equation (11) that $Q$ must be equal to or greater than $1.43\, s$.

The criticality of the residence time is illustrated by the data in Table V. These data were obtained from the continuous process bulk polymerization of a mixture of monomers consisting of 83 percent by weight acrylonitrile and 17 percent by weight vinyl acetate, containing 50 ppm of water, at 50°C. The catalyst used consisted of 0.04 percent cumeme hydroperoxide and 0.169 percent by weight $SO_2$ ($K_d = 1.08$ hr.$^{-1}$) based on the monomer mixture.

TABLE V

| Residence time(Q) in hours | Product $K_d \times Q$ | Conversion, % | Remarks |
|---|---|---|---|
| 1 | 1.08 | 12 | Control of reaction temperature is at the limit of acceptability |
| 0.66 | 0.71 | 8.5 | Control is difficult |
| 0.33 | 0.38 | — | Control is impossible |

The critical effect of the catalyst concentration is illustrated by the data in Table VI. These data were obtained from the continuous bulk polymerization of a mixture consisting of 83 percent by weight acrylonitrile and 17 percent by weight vinyl acetate, at 50°C. The catalyst was cumene hydroperoxide, $SO_2$, and water. The $SO_2$/cumene hydroperoxide molar ratio was 10, and the water content of the monomer was about 0.3 percent by weight.

TABLE VI

| Concentration of the cumene hydroperoxide | | Q, hrs. | Q×2×10$^{-3}$ | Conversion % | Remarks |
|---|---|---|---|---|---|
| %, based on monomers | Moles/liter | | | | |
| 0.200 | 13.2 × 10$^{-3}$ | 1 | 2×10$^{-3}$ | 54.0 | Reaction medium fluid. Reaction under control. |
| 0.160 | 10.5 × 10$^{-3}$ | 1 | 2×10$^{-3}$ | 49.2 | Reaction medium fluid. Reaction under control. |
| 0.080 | 5.3 × 10$^{-3}$ | 1 | 2×10$^{-3}$ | 45.8 | Reaction medium fluid. Reaction under control. |
| 0.040 | 2.6 × 10$^{-3}$ | 1 | 2×10$^{-3}$ | 33.0 | Reaction medium fluid. Reaction under control. |
| 0.030 | 1.9 × 10$^{-3}$ | 1 | 2×10$^{-3}$ | ~25 | Thickening of the reaction medium. Reaction out of control. |
| 0.080 | 5.3 × 10$^{-3}$ | 0.66 | 1.34×10$^{-3}$ | 39.8 | Reaction medium fluid. Reaction under control. |
| 0.040 | 2.6 × 10$^{-3}$ | 0.66 | 1.34×10$^{-3}$ | 28.5 | Reaction medium fluid. Reaction under control. |
| 0.030 | 1.9 × 10$^{-3}$ | 0.66 | 1.34×10$^{-3}$ | 22.6 | Reaction medium fluid. Reaction under control. |
| 0.020 | 1.3 × 10$^{-3}$ | 0.66 | 1.34×10$^{-3}$ | ~16 | Thickening of the reaction medium. Reaction out of control. |

From the data in Table VI, it is apparent that the reaction mixture becomes less fluid, i.e., it thickens, as the concentration of the catalyst (cumene hydroperoxide) is decreased below the value corresponding to $2\times10^{-3}$ $Q$. This occurs in spite of the decreased concentration of the polymer in the reactor.

Free-radical catalysts having a high decomposition rate constant which are suitable for use in the present invention include organic esters such as tert.butyl-phenylmethyl peracetate, phenylacetyl peroxide, tert.butyl-2-(phenylthio) perbenzoate, and the like. Also suitable are catalytic systems consisting of (1) an organic hydroperoxide R-O-O-H wherein R may be a linear or branched chain alkyl radical, a cycloalkyl or an aryl-alkyl radical, for example, cumene hydroperoxide, tert.butyl hydroperoxide or cyclohexanone hydroperoxide, (2) an oxidizable sulfoxy compound such as sulfur dioxide and (3) a nucleophilic compound such as water, methyl alcohol, ethyl alcohol, or a higher alcohol, or a hydroxide of an alkali metal or of magnesium or of ammonium. Additional suitable catalyst systems include an organic hydroperoxide, for example, cumene hydroperoxide, tert.butyl hydroperoxide or cyclohexanone hydroperoxide and a mono-ester of sulfurous acid having the formula

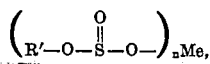

wherein:

R' is an alkyl, cycloalkyl, aryl or alkyl-aryl radical having from 1 to 12 carbon atoms; and Me is a metal selected from the first and second groups of the Periodic System, ammonium and aluminum; and n is 1, 2 or 3, the valency of Me.

Yet another suitable catalyst system includes an organic hydroperoxide, for example, cumene hydroperoxide, tert.butyl hydroperoxide or cyclohexanone hydroperoxide, a magnesium alcoholate, and a dialkyl sulfite having the formula:

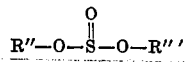

wherein:

R'' and R''' are the same or different, and may each be a substituted or unsubstituted linear or branched chain alkyl radical, or a cycloalkyl radical, each of R'' and R''' having from one to 12 carbon atoms.

The preferred catalysts are those consisting of an organic hydroperoxide, an oxidizable sulfoxy compound and a nucleophilic compound. Such catalysts are preferred because of their reduced cost and ease of use and handling. Moreover, the presence of the sulfoxy compound as a reducing agent provides a means for introducing sulfonic acid groups into the polymer in order to improve its dyeability with basic dyes.

In such catalytic systems, the molar ratio of the activator to the catalyst, that is, the ratio between the oxidizable sulfoxy compound and the organic hydroperoxide, is not critical insofar as the present invention is concerned. This ratio may vary over a wide range, e.g., from about 0.1 to 500. Very small amounts of the nucleophilic compound, e.g., the trace amounts usually present in the monomer, are generally sufficient.

Additionally, the process of the present invention is advantageous in that the slurry obtained at the reactor outlet does not require premature stopping of the polymerization reaction, and a polymer product having excellent chemical and physical properties can be easily separated from the slurry by evaporation of the volatile products therein.

It is, of course, understood that polymerization conditions $a$, $b$, $c$, and $d$ are required to be present when the process is on-line, i.e., it has reached a steady state with respect to the conversion and the catalyst concentration, but that a finite amount of time is required during the start-up to reach these conditions.

While numerous start-up procedures may be employed, we have found it preferable to use those procedures wherein the catalyst concentration is increased to the desired level as rapidly as possible. Use of an improper start-up procedure can lead to difficulty in controlling the reaction. Thus, if the catalyst and monomer are initially fed, in steady-state quantities, into a reactor fully pre-charged with the monomer, the reaction medium will suddenly thicken after 30 to 90 minutes. This leads to loss of control over the polymerization process.

The following start-up procedure is preferred:

The catalytic system is fed into the reactor, pre-loaded to half its volume with the monomer or mixture of monomers, at the same flow rate as that of the steady state condition.

After a time equal to one half of the total residence time, the monomer is fed in at the same flow rate as that of the steady state condition. Using this method, it is possible to reach a steady state concentration of the catalyst in a time corresponding to one half the residence time, while maintaining the reaction medium in a highly fluid state.

This starting procedure may also be used for a semicontinuous process.

An alternative start-up procedure comprises pre-loading the reactor with half the volume of monomer (or mixture thereof) and then feeding the catalyst into the reactor at the same flow rate which would be used at the steady state condition. The monomer (or mixture of monomers) is contemporaneously fed into the reactor, but at a flow rate equal to half the flow rate which would be used at the steady state condition for the entire residence time.

The polymerization may be carried out within a wide range of temperatures, the preferred temperatures being between about room temperature and 60°C. The polymerization temperature may be controlled by conventional means, for example, immersion of the reactor in a thermostatic bath, circulating a cooling fluid around the reactor walls, internal cooling coils, or removing the reaction heat by evaporation of the reaction medium.

Preferably, the polymerization is carried out in the absence of oxygen, which has an inhibiting effect on the polymerization.

Ethylenically unsaturated monomers suitable for copolymerization with acrylonitrile in accordance with the present process include alkyl acrylates, aryl acrylates, and cycloalkyl acrylates such as, methyl acrylate, ethyl acrylate, isobutyl acrylate, and the like; alkyl methacrylates, aryl methacrylates, and cycloalkyl methacrylates such as methyl methacrylate, ethyl methacrylate, isobutyl methacrylate, dimethylaminoethyl methacrylate, and the like; unsaturated ketones; vinyl esters, such as, vinyl acetate, vinyl proprionate, and the like; vinyl ethers; an alkyl vinyl pyridine such as 2-methyl-5-vinyl-pyridine; styrene, and its alkyl derivatives; vinyl or vinylidene chloride; vinyl fluoride; vinyl bromide; methacrylonitrile; butadiene, etc.

Additionally, the polymerization may be carried out in the presence of chain transfer agents such as the alkyl mercaptans, which also exert a fluidizing effect on the reaction, as well as in the presence of inert organic compounds such as saturated hydrocarbons, halogenated saturated hydrocarbons, and the like. The inert organic compounds exert a diluent effect on the reaction mixture.

The homopolymers and copolymers obtained using the process of the prsent invention possess an apparent density considerably greater than that of the polymers obtained according to heretofore known processes. Particularly, polymers prepared with the present process always possess apparent densities greater than 0.4 g/cc.

The homopolymers and copolymers prepared by the present process are suitable for transformation into fibers or filaments by conventional wet or dry spinning methods. The wet or dry spinning procedures are suitably carried out from solutions of the polymers in any of the conventionally used solvents for acrylic polymers, such as N,N-dimethylacetamide, N,N-dimethylformamide, ethylene carbonate, dimethyl sulfoxide, and the like, as well as in aqueous solutions of sodium thiocyanate, zinc chloride, lithium bromide, and the like.

| Time in minutes: | 5 | 10 | 15 | 20 | 25 | 30 | 60 | 120 |
|---|---|---|---|---|---|---|---|---|
| Conversion, %: | 1.8 | 3.5 | 5.2 | 6.2 | 6.7 | 6.8 | 6.8 | 6.8 |

As noted hereinabove, when the polymerization of the acrylonitrile is carried out using a sulfur compound as the reducing agent in the catalytic system, the polymers and the fibers obtained therefrom possess sulfonic acid end groups which react with basic dyes. The excellent receptivity of such polymers and copolymers of the present invention to basic dyes may be shown by determining the number of milliequivalents of ionizable sulfonic acid end groups available per kilogram of polymer. Numerous methods are known for making such a determination. The preferable method is that described in "The Society of Dyers and Colourists," 80: 577 (1964).

In this method, a 1 percent by weight solution in dimethyl formamide of the polymer to be tested is prepared. This solution is then passed through an ion-exchange column containing two equal and separated quantities, respectively, of Amberlite IR 120 (a cationic resin) in the upper part of the column, and Amberlite IR 410 (an anionic resin) in the lower part of the column. The column is 50 cm. high and has an inside diameter of 1.9 cm.

The dimethyl formamide solution, after passing through the column, is then titrated for sulfonic acid groups with a solution of a quarternary ammonium base in methanol. The titration is carried out potentiometrically using a platinum electrode.

The results of the titration are expressed as milliequivalents of sulfur, in the form of sulfonic acid groups, per kilogram of dry polymer.

It is, of course, apparent that the dyeability of the fibers obtained from this polymer is proportional to the number of milliequivalents of sulfur in the polymer as determined by this method.

The following examples further illustrate the present invention. In the examples, the intrinsic viscosity of the polymer was determined in a 0.1 percent dimethyl formamide solution at 25°C.

The color of the polymer was determined using a General Electric Spectrophotometer Integrator, according to the C.I.E. system of measurement and characterization. Under this system, the color is expressed as the purity index (PI) and brightness (B) as compared to a standard light which is an emission source corresponding to a black body heated at 6,200°K.

EXAMPLE 1

A bulk polymerization of acrylonitrile was carried out in the presence of a catalytic system consisting of cumene hydroperoxide, dimethyl sulfite and magnesium methylate. The decomposition rate constant ($K_d$) of this catalytic system was determined in the following manner:

Into a 2,000 cc reactor, pre-charged with 1,600 g of acrylonitrile containing 300 ppm of water and maintained at a temperature of 50°C, were added 3.2 g of cumene hydroperoxide (0.2 percent b.w. with respect to the monomer), 23.2 g of dimethyl sulfite and 18.1 g of magnesium methylate dissolved in 150 cc of methyl alcohol.

The polymerization started instantaneously. The polymerization course was followed by withdrawing samples every 5 minutes and measuring the conversion. the following conversion values were obtained:

As noted hereinabove, the semi-decomposition time ($s$) of such a catalyst corresponds to the time required to reach 29 percent of the final conversion in a discontinuous process. From the foregoing data, it can be determined that 29 percent of the end conversion, i.e., 6.8 percent, is 1.97 percent and that 1.97 percent conversion corresponds to a reaction time of 6 minutes (0.1 hour).

The decomposition rate constant $K_d$ is calculated from the following equation:

$$K_d \cdot s = 0.7.$$

Since $s$ is 0.1 hours, $K_d = 7$ hr$^{-1}$, which is within the range required for carrying out the process of the present invention, i.e., $K_d > 1$ hr$^{-1}$.

Accordingly, the residence time ($Q$) of the continuous polymerization must be:

$$Q \geq 1/K_d = 1.43 \, s = 0.143 \, \text{hr}.$$

Continuous polymerizaton:

The following were continuously fed into a 2,000 cc polymerization reactor fitted with a stirrer, overflow pipe, cooling system and thermometer, pre-loaded with 800 g acrylonitrile having a water content of 280 ppm, and maintained at a temperature of 50°C:

3.2 g/hr of cumene hydroperoxide,
   23.2 g/hr of dimethyl sulfite
   18.1 g/hr of magnesium methylate dissolved in 150 cc of methyl alcohol.

After the first 30 minutes, acrylonitrile was fed into the reactor at a flow rate of 1,600 g/hr. (The total residence time was 1 hour).

After about 30 additional minutes, the polymerization suspension started to discharge through the overflow pipe. The polymer, collected under steady state conditions, filtered, washed with water and dried at 60°C for 24 hours, amounted to 26 percent of the fed monomer. That is, the polymerization conversion amounted to 26 percent.

EXAMPLE 2

The following were continuously fed into a 2.5 liter polymerization reactor provided with a stirrer, cooling system, thermometer and overflow pipe, preloaded with 1,000 g of acrylonitrile having a water content of 0.3 percent by weight, and maintained at a temperature of 20°C:

1.9 g/hr of tert.butyl hydroperoxide,
25 cc/hr of a 10 percent methanol solution of sodium methyl sulfite.

After the first 30 minutes, acrylonitrile was fed into the reactor at a flow rate of 2,000 g/hr (the acrylonitrile density was 0.8 g/cc).

After about 30 additional minutes, the polymerization slurry started to discharge through the overflow pipe. The polymerization conversion was 42 percent. The polymer, collected under steady state conditions, filtered, washed with water and dried for 24 hours at 60°C, possessed the following characteristics:

| | | |
|---|---|---|
| Intrinsic viscosity | 2.0 | dl/g |
| Monovalent sulfonic acid end groups, expressed in milliequivalents per Kg of dry polymer | 26 | |
| Apparent density | 0.53 | g/cc |
| Color { PI = | 98.5 | |
| { B = | 96.2 | |

EXAMPLE 3

The following were continuously fed into a 2.5 liter autoclave fitted with a stirrer, a thermometer and an overflow pipe, pre-loaded to half its volume with a mixture consisting of 83 percent acrylonitrile and 17 percent vinyl acetate (water content, about 0.3 percent by weight), and maintained at a temperature of 50°C:

5 g/hr of cumene hydroperoxide;
80 g/hr of gaseous $SO_2$.

The polymerization temperature of 50°C was maintained constant by evaporation of the reaction medium and by the refluxing the condensate at atmospheric pressure.

After the first 30 minutes, the mixture of the monomers was continuously fed into the reactor at a flow rate of 2,000 g/hr.

After 30 additional minutes, the polymeric slurry thus obtained started to discharge through the overflow pipe. Under steady state conditions, one part of this slurry, designated as (A), was filtered, washed with water and then dried for 24 hours at 60°C.

Another part of the slurry, designated as (B), was directly dried in an oven at 150°C for 5 minutes.

The polymerization conversion was 53 percent by weight. The respective polymers A and B possessed the following characteristics:

| | Polymer A | | Polymer B | |
|---|---|---|---|---|
| Intrinsic viscosity | 1.5 | dl/g | 1.5 | dl/g |
| Monovalent sulfonic acid end groups, expressed in milliequivalents per Kg of dry polymer | 35 | | 35 | |
| Apparent density | 0.62 | g/cc | 0.62 | g/cc |
| Copolymerized vinylacetate | 7.4% | | 7.4% | |

-Continued

| | | Polymer A | Polymer B |
|---|---|---|---|
| Color | { PI = | 98.6 | 98.6 |
| | { B = | 95.7 | 95.8 |

EXAMPLE 4

The following were continuously fed into a 2,000 cc polymerization reactor fitted with a stirrer, overflow pipe, thermometer, and cooling system, pre-loaded with 800 g of acrylonitrile having a water content of 0.30 percent, and maintained at a temperature of 40°C:

4.0 g/hr of cumeme hydroperoxide;
112 g/hr of gaseous $SO_2$.

After the first 30 minutes, acrylonitrile (water content of 0.3 percent) was fed into the reactor at a flow rate of 1,600 g/hr. The residence time was 60 minutes. After 30 additional minutes, the polymerization slurry started to discharge through the overflow pipe. The polymer was filtered and dried at 50°C for 6 hours.

The polymerization conversion amounted to 60 percent and the polymer possessed the following characteristics:

| | | |
|---|---|---|
| Intrinsic viscosity | 2.5 | dl/g |
| Monovalent sulfonic acid groups, expressed in milliequivalents per Kg of dry polymer | 21.0 | |
| Apparent density | 0.62 | g/cc |
| Color { PI = | 98 | |
| { B = | 95 | |

EXAMPLE 5

Unless otherwise specified, the equipment, conditions and procedure were the same as those in Example 4. The reactor was pre-loaded with 800 g of a mixture of 93 percent acrylonitrile and 7 percent methyl acrylate. (Water content of the mixture, 0.3 percent.) The following were continuously fed into the reactor:

3.8 g/hr of cumene hydroperoxide;
65 g/hr of gaseous $SO_2$.

After the first 30 minutes, the monomer mixture was fed into the reactor at a flow rate of 2,400 g/hr. The residence time was 40 minutes. A polymerization conversion of 52 percent was obtained, and the copolymer possessed the following characteristics:

| | | |
|---|---|---|
| Intrinsic viscosity | 2.0 | dl/g |
| Monovalent sulfonic acid groups | 21 | |
| Apparent density | 0.58 | g/cc |
| Copolymerized methyl acrylate | 5.3% | |
| Color { PI = | 98.6 | |
| { B = | 95 | |

EXAMPLE 6

The procedure of Example 5 was followed except that the following monomer mixture was used:

96.5 percent acrylonitrile and
3.5 percent methylmethacrylate. (Water content of the mixture, 0.38 percent.)

A conversion of 47 percent was obtained, and the copolymer possessed the following characteristics:

| | | |
|---|---|---|
| Intrinsic viscosity | 2.0 | dl/g |
| Monovalent sulfonic acid groups | 25 | |
| Apparent density | 0.49 | g/cc |
| Copolymerized methylmethacrylate | 4% | |
| Color { PI = | 98.9 | |
| { B = | 95.2 | |

EXAMPLE 7

The procedure of Example 5 was followed except that the following monomer mixture was used:
93 percent of acrylonitrile and
7 percent of methacrylonitrile. (Water content of the mixture, 0.3 percent.)

A polymerization conversion of 35 percent was obtained, and the copolymer possessed the following characteristics:

| | | |
|---|---|---|
| Intrinsic viscosity | 1.6 | dl/g |
| Monovalent sulfonic acid groups | 36 | |
| Apparent density | 0.43 | g/cc |
| Color { PI = | 99 | |
| { B = | 95. | |

EXAMPLE 8

The following were continuously fed into a 2,000 cc adiabatic polymerization reactor fitted with a stirrer, overflow pipe, and thermometer, cooled by evaporation of the reaction mass with contemporaneous condensation of the vapors by a reflux condenser maintained at −20°C and reflux of the same into the reaction mass, and pre-loaded with 800 g of a monomer mixture of acrylonitrile (83 percent) and vinylacetate (17 percent) (water content, 0.3 percent):

4.0 g/hr of cumene hydroperoxide;
165 g/hr of gaseous $SO_2$.

After the first 30 minutes, the monomer mixture was fed into the reactor at a flow rate of 1,650 g/hr.

The residence time was 55 minutes and the polymerization temperature was 47°C, which corresponds to the boiling temperature of the reaction mixture at room pressure.

Under such conditions, the decomposition rate of cumene hydroperoxide (CHP) is given by the following expression:

$$-d(CHP)/dt = 2.7 \times 10^4 (CHP) \text{ moles/liter } h^{-1}$$

A conversion of 35 percent was obtained, and the copolymer possessed the following characteristics:

| | | |
|---|---|---|
| Intrinsic viscosity | 1.5 | dl/g |
| Monovalent sulfonic acid groups | 35 | |
| Apparent density | 0.44 | g/cc |
| Copolymerized vinylacetate | 6.5% | |
| Color { PI = | 98 | |
| { B = | 94 | |

EXAMPLE 9

The procedure of Example 5 was followed. The reactor was pre-loaded with 800 g of a mixture consisting of 81 percent acrylonitrile and 19 percent vinylacetate maintained at a temperature of 45°C.

The following were continuously fed into the reactor:
4.4 g/hr of cumene hydroperoxide;
5.5 g/hr of sodium bisulfite in a 52 percent aqueous solution;
13.5 g/hr of gaseous $SO_2$.

After the first 30 minutes, the monomer mixture was also fed into the reactor at a flow rate of 2,000 g/hr (residence time 60 minutes).

A polymerization conversion of 48 percent was obtained, and the copolymer possessed the following characteristics:

| | | |
|---|---|---|
| Intrinsic viscosity | 1.5 | dl/g |
| Monovalent sulfonic acid groups | 32 | |
| Apparent density | 0.65 | g/cc |
| Color { PI = | 98.5 | |
| { B = | 95.5 | |

EXAMPLE 10

Into a 2.5 liter autoclave fitted with a stirrer and a thermometer, pre-loaded with 800 g of a monomer mixture consisting of 75 percent acrylonitrile and 25 percent vinylacetate (water content of the mixture, 0.3 percent), and maintained at a temperature of 20°C, during one hour, the following were fed:

4 g of cumene hydroperoxide;
24 g of gaseous $SO_2$; and
800 g of a monomer mixture consisting of 80 percent acrylonitrile and 20 percent vinylacetate.

After 10 minutes, the temperature was raised to 40°C and maintained at such value during the entire reaction time. After one hour, the feeding was stopped and the polymer was recovered by filtration of the polymerization slurry.

The polymerization conversion amounted to 35 percent, and the copolymer possessed the following characteristics:

| | | |
|---|---|---|
| Intrinsic viscosity | 1.5 | dl/g |
| Monovalent sulfonic acid groups | 35 | |
| Copolymerized vinylacetate | 7% | |
| Apparent density | 0.58 | g/cc |
| Color { PI = | 98.5 | |
| { B = | 95.5 | |

EXAMPLE 11

The following were continuously fed into a 2,000 cc polymerization reactor fitted with a stirrer, overflow pipe, thermometer, and cooling system, pre-loaded with 800 g of a mixture of 97 percent acrylonitrile and 3 percent styrene (water content of the mixture, 0.3 percent), and maintained at a temperature of 40°C.:

8.0 g/hr of cumene hydroperoxide; and
16.90 g/hr of gaseous $SO_2$.

After the first 15 minutes, the monomer mixture was fed into the reactor at a flow rate of 3,200 g/hr. The residence time was 30 minutes. A polymerization conversion of 40 percent was obtained, and the copolymer possessed the following characteristics:

| | | |
|---|---|---|
| Intrinsic viscosity | 1.7 | dl/g |
| Monovalent sulfonic acid groups | 32 | |
| Apparent density | 0.5 | g/cc |
| Copolymerized styrene | 6% | |
| Color { PI = | 99 | |
| { B = | 95.3 | |

EXAMPLE 12

Into the reactor of Example 11, pre-loaded with 1,160 g of a mixture of 50 percent acrylonitrile and 50 percent vinyl bromide (water content of the mixture, 0.2 percent), and maintained at a temperature of 20°C, the following were continuously fed:

5.8 g/hr of cumene hydroperoxide; and 45 cc/hr of a 10 percent methanol solution of dimethylsulfite.

After the first 30 minutes, the monomer mixture was fed into the reactor at a flow rate of 2,320 g/hr.

The residence time was 60 minutes. A polymerization conversion of 25 percent was obtained, and the copolymer possessed the following characteristics:

| | | |
|---|---|---|
| Intrinsic viscosity | 1 | dl/g |
| Apparent density | 0.45 | g/cc |
| Copolymerized vinyl bromide | 30% | |
| Color  PI = | 97.5 | |
| B = | 94.5. | |

EXAMPLE 13

Into the reactor of Example 11, pre-loaded with 800 g of a mixture of 75 percent acrylonitrile, 5 percent 2-methyl-5-vinyl-pyridine, and 20 percent of vinylacetate, and maintained at a temperature of 40°C, the following were continuously fed:

8.0 g/hr of cumene hydroperoxide; and 6.6 g/hr of gaseous $SO_2$.

After the first 15 minutes, the monomer mixture was fed into the reactor at a flow rate of 3,200 g/hr. The residence time was 30 minutes. A polymerizatiON conversion of 40 percent was obtained, and the copolymer possessed the following characteristics:

| | | |
|---|---|---|
| Intrinsic viscosity | 2 | dl/g |
| Apparent density | 0.5 | g/cc |
| Copolymerized methyl-vinyl pyridine | 5% | |
| Copolymerized vinylacetate | 7% | |

EXAMPLE 14

The procedure of Example 13 was followed except that the following monomer mixture was used:

95 percent acrylonitrile; and 5 percent dimethylaminoethylmethacrylate.

A conversion of 40 percent was obtained, and the copolymer showed the following characteristics:

| | | |
|---|---|---|
| Intrinsic viscosity | 2.4 | dl/g |
| Apparent density | 0.5 | g/cc |
| Copolymerized dimethylethylaminomethacrylate | 3%. | |

Variations can, of course, be made without departing from the spirit and scope of the invention.

Having thus described the invention, what we desire to secure by Letters Patent and hereby claim is:

1. A process for the bulk polymerization of a mixture of acrylonitrile and at least one other ethylenically unsaturated monomer copolymerizable therewith, said other ethylenically unsaturated monomer being present in the mixture in an amount up to about 50 mole percent, said process comprising carrying out the polymerization according to a continuous or semi-continuous polymerization procedure in the presence of a free-radical catalytic system having a decomposition rate constant ($k_d$) greater than 1 hr$^{-1}$ at the polymerization temperature, the reaction or residence time in hours ($Q$) being at least sufficient to semi-decompose d catalyst, and $Q \times K_3 \geq 1$, said catalyst being present in a concentration $(C)_o$ at least equal to $2 \times 10^{-3} \times Q$ moles/liter.

2. The process of claim 1, wherein the polymerization is carried out using a continuous method.

3. The process of claim 1, wherein the other ethylenically unsaturated monomer is selected from the group consisting of an alkyl acrylate, an aryl acrylate, a cycloalkyl-acrylate, an alkyl methacrylate, an aryl methacrylate, a cycloalkyl methacrylate, an unsaturated ketone, a vinyl ester, a vinyl ether, an alkylvinyl pyridine, styrene, an alkyl derivative of stryene, a vinyl or vinylidene halide, methacrylonitrile, and butadiene.

4. The process of claim 3, wherein the alkyl acrylate is selected from the group consisting of methyl acrylate, ethyl acrylate and isobutyl acrylate, the alkyl methacrylate is selected from the group consisting of methyl methacrylate, ethyl methacrylate, isobutyl methacrylate and dimethylaminoethyl methacrylate, the vinyl ester is selected from the group consisting of vinyl acetate and vinyl propionate, the alkylvinylpyridine is 2-methyl-5-vinyl-pyridine, and the vinyl or vinylidene halide is selected from the group consisting of vinyl chloride, vinylidene chloride, vinyl fluoride and vinyl bromide.

5. The process of claim 1, wherein the freeradical catalyst is selected from the group consisting of:

a. an organic ester selected from the group consisting of tert.butylphenylmethyl peracetate, phenylacetyl peroxide, and tert.butyl-2-(phenylthio) perbenzoate;

b. an organic hydroperoxide, sulfur dioxide, and a nucleophilic compound;

c. an organic hydroperoxide and a mono-ester of sulfurous acid having the formula:

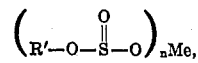

wherein

R' is an alkyl, cycloalkyl, aryl or alkyl-aryl radical having from one to 12 carbon atoms, Me is a metal of the 1st or 2nd group of the Periodic System, ammonium, or aluminum; and $n$ is 1, 2 or 3, the valency of Me; and d. an organic hydroperoxide, a magnesium alcoholate, and a dialkylsulfite having the formula:

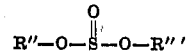

wherein:

R'' and R''' are independently selected from the group consisting of substituted and unsubstituted linear or branched chain alkyl radicals, and a cycloalkyl radical, each of R'' and R''' having from one to 12 carbon atoms.

6. The process of claim 1 wherein the polymerization is carried out at a temperature between about room temperature and 60°C and in the absence of oxygen.

7. The process of claim 1 wherein the polymerization is started by:
   a. preloading a reactor to half its volume with the monomer or monomers to be polymerized;
   b. introducing the catalyst into the preloaded reactor at a flow rate equal to that which would be used at the steady state condition of the polymerization; and
   c. after a time equal to about one half of the total reaction time, introducing the monomer or mixture of monomers into the reactor at a flow rate equal to the flow rate at the steady state condition.

8. The process of claim 1 wherein the polymerization is started by:
   a. preloading a reactor to half its volume with the monomer or mixture of monomers to be polymerized;
   b. introducing the catalyst into the reactor at a flow rate equal to the flow rate which would be used at the steady state condition of the polymerization; and
   c. contemporaneously with the introduction of the catalyst, introducing the monomer or mixture of monomers into the reactor at a flow rate equal to one half the flow rate which would be used at the steady state condition for one entire residence time.

* * * * *

UNITED STATES PATENT OFFICE
CERTIFICATE OF CORRECTION

Patent No. 3,839,288   Dated October 1, 1974

Inventor(s) Paolo Melacini et al

It is certified that error appears in the above-identified patent and that said Letters Patent are hereby corrected as shown below:

Column 2, line 68: "assure homogeneous" should read -- assure a homogeneous --.

Column 3, line 23: "$(C)_o=2(C).3.$" should read -- $(C)_o=2(C).3.$ --.

Column 4, line 50: "azo-bis-iso-butyrenitrile," should read -- azo-bis-iso-butyronitrile, --.

Columns 5-6, Table IV, No. "2) Sulfur dioxide", under the heading "$Kd, Hr.^{-1}$": "1.03" should read -- 1.08 --.

Column 8, line 4: "cumeme" should read -- cumene --.

Column 10, lines 63-64: "proprionate," should read -- propionate --.

Column 11, line 10: "prsent" should read -- present --.

Column 12, line 25: "conversion. the" should read -- conversion. The --; line 55: "800 g. acrylonitrile" should read -- 800 g. of acrylonitrile --.

Column 13, line 45: "by the refluxing" should read -- by refluxing --.

Column 14, line 16: "cumeme hydroperoxide;" should read -- cumene hydroperoxide --; line 65: "0.38 percent.)" should read -- 0.3 percent.) --.

UNITED STATES PATENT OFFICE
CERTIFICATE OF CORRECTION

Patent No. 3,839,288    Dated October 1, 1974

Inventor(s) Paolo Melacini et al

It is certified that error appears in the above-identified patent and that said Letters Patent are hereby corrected as shown below:

Column 15, lines 48-49: "$-d(CHP/dt=2.7 \times 10^4 (CHP) \text{moles}/\text{liter } h^{-1}$" should read -- $-d(CHP)/dt=2.7 \times 10^4 (CHP) \text{moles}/\text{liter } h^{-1}$ --.

Column 17, line 34: "polymerizatiON" should read -- polymerization --.

Column 18, line 4: "d" should read -- the --; line 5: "$Q \times K_3 \gtrsim 1$" should read -- $Q \times K_d \quad 1$ --.

Signed and sealed this 3rd day of December 1974.

(SEAL)
Attest:

McCOY M. GIBSON JR.
Attesting Officer

C. MARSHALL DANN
Commissioner of Patents